V. STASCH.
BRAKE DEVICE FOR STOPPING RUNAWAY TRUCKS ON INCLINED TRACKS.
APPLICATION FILED JUNE 22, 1911.

1,031,152.

Patented July 2, 1912.

2 SHEETS—SHEET 1.

WITNESSES:
John H. Hoving
Alfred R. Anderson

INVENTOR:
VALENTIN STASCH
By H. van Seldernest
Attorney

V. STASCH.
BRAKE DEVICE FOR STOPPING RUNAWAY TRUCKS ON INCLINED TRACKS.
APPLICATION FILED JUNE 22, 1911.

1,031,152.

Patented July 2, 1912.
2 SHEETS—SHEET 2.

WITNESSES:
John H. Hoving.
Alfred R. Anderson

INVENTOR:
VALENTIN STASCH
By Hiram Osterman
Attorney.

COLUMBIA PLANOGRAPH CO., WASHINGTON, D. C.

UNITED STATES PATENT OFFICE.

VALENTIN STASCH, OF FRIEDENSHUTTE, GERMANY.

BRAKE DEVICE FOR STOPPING RUNAWAY TRUCKS ON INCLINED TRACKS.

1,031,152. Specification of Letters Patent. Patented July 2, 1912.

Application filed June 22, 1911. Serial No. 634,814.

*To all whom it may concern:*

Be it known that I, VALENTIN STASCH, a citizen of the German Empire, and residing at Friedenshutte, Silesia, German Empire, have invented a new and Improved Brake Device for Stopping Runaway Trucks on Inclined Tracks, of which the following is a description.

The present invention consists of an improved device for stopping runaway trucks or cars on inclined railway tracks and of a frame mounted to slide on the rails and having pivotally supported therein an upwardly extending lever adapted, when violently struck by any suitable part of a runaway car or truck to throw up the coupling hook which will engage the axle or any other suitable part of the truck and couple it to the frame, which then acts as a brake shoe on the rails. Under normal conditions, the upwardly extending lever will simply swing underneath the passing truck in whichever direction the truck passes without raising the coupling hook sufficiently to effect the braking operation.

Figure 1:
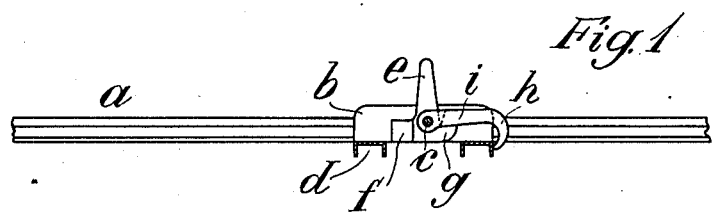
Figure 2:
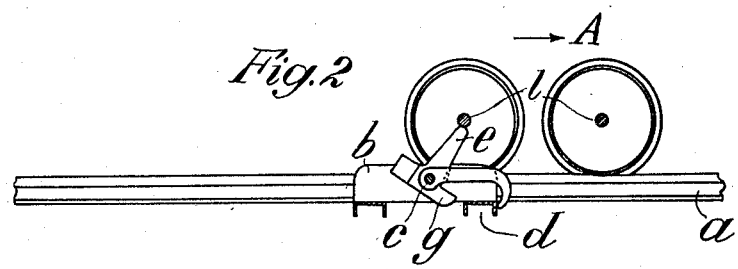
Figure 3:
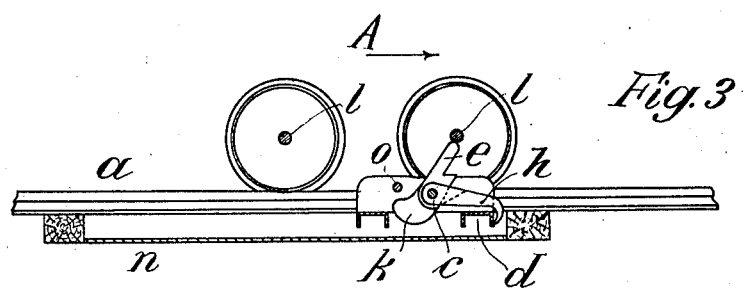
Figure 4:
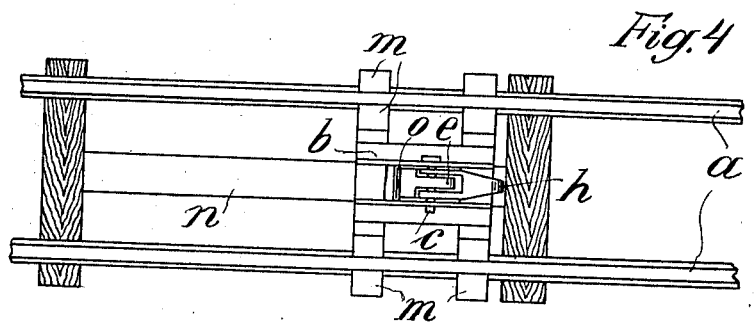
Figure 5:
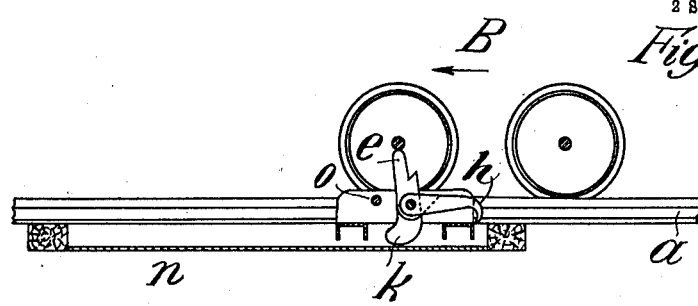
Figure 6:
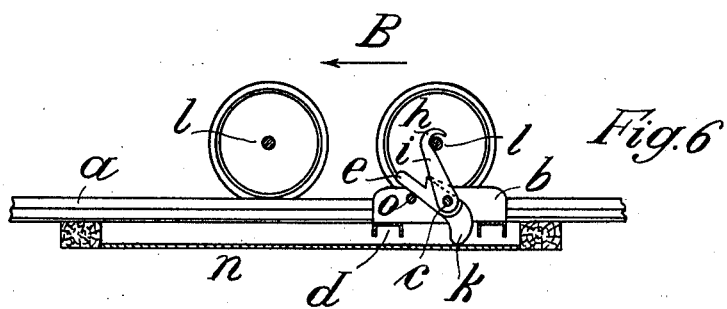
Figure 7:
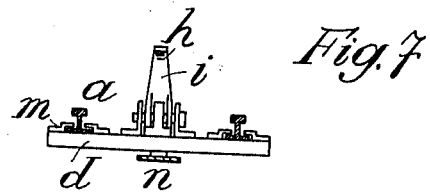

In the accompanying drawings, several forms of embodying the invention are illustrated, Figure 1 being a sectional side elevation of one form of the device, showing the parts in the ordinary position and Fig. 2 a similar elevation, showing the lever swinging when a truck, going at the ordinary speed, is passing over the same. Fig. 3 is a similar side elevation of a slightly modified form, showing the position of the parts on the ordinary passage of a truck and Fig. 4 is a plan view of the same. Figs. 5 and 6 are elevations, showing the position occupied by the parts at the commencement (Fig. 5) when struck by a runaway truck, and in the coupling position (Fig. 6) to arrest the truck. Fig. 7 is an end elevation of the frame and lever and Fig. 8 is a side elevation showing a simplified form of the device.

Referring first to Figs. 1 and 2, the frame $b$ is provided with transverse U-irons $d$ extending underneath the rails and provided with guides $m$ (Fig. 7), adapted to overlap the feet of the rails and thus to allow the whole frame to slide along the same but also causing considerable friction. The upwardly extending flanges $b$, constituting the frame, carry a pivot $c$ on which is loosely mounted a lever $e$ having a weighted arm $f$ and a forwardly projecting finger $g$. A coupling hook $h$ is also mounted on the pivot $c$ and embraces the lever $e$ by means of its bifurcated end $i$. The finger $g$ engages under this coupling hook $h$ and when the upwardly extending arm $e$ is violently struck by a runaway car, the coupling will be thrown up high enough to engage the next following axle 1 of the car. Under ordinary circumstances (Figs. 2 and 3) when the car is running in the direction of the arrow A it will simply tip the lever $e$ without operating the coupling hook at all.

In the device illustrated in Figs. 3 and 4, a brake rail $n$ is mounted between the tracks underneath the same and the lever $e$ is provided with a downwardly extending cam-shaped end $k$, a stop pin $o$ being provided on the frame to limit the movement of the lever $e$ when it has thrown the coupling hook up to engage a runaway car. In this position, *i. e.* when the car is rushing down in the direction of the arrow B (Figs. 5 and 6), the first axle of the car will strike the upwardly extending lever $e$ violently throwing the same over into the position illustrated in Fig. 6 and also throwing up the coupling hook $h$, so that the same will engage the next following axle of the car, coupling the lever to the frame $b$, the lower cam-shaped end $k$ of the lever $e$ being forced down on to the brake rail $n$ by the subsequent movement of the hook $h$. Thus, it will be seen that the weight of the car is utilized to jam the frame $b$ against the rails and at the same time to brake the sliding movement of the same by forcing the cam $k$ down on to the brake rail $n$. When the car passes over the lever $e$ in the direction of the arrow B in Figs. 5 and 6, at the ordinary speed for traveling, it will simply swing the lever $e$, slightly raising the hook $h$ and both parts will return to their initial position under the influence of the weighted end $f$ or $k$ of the lever without allowing the coupling hook to be thrown up sufficiently to engage the axle of the car.

Figure 8:
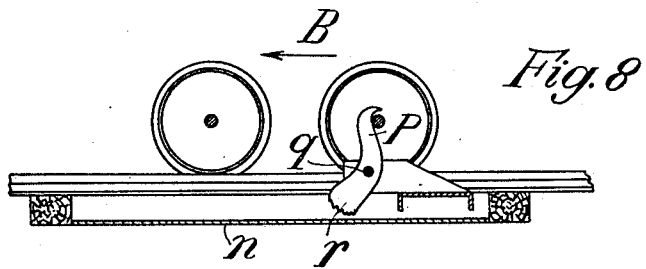

In Fig. 8 a simplified form of the invention is illustrated which shows a coupling hook $p$ simply pivoted to a frame mounted on the rails and having a weighted cam-shaped end $r$ adapted to engage the brake rail $n$ when a runaway car in the direction of the arrow B in Fig. 8 engages the hook. When running in the opposite direction, the coupling hook will simply be turned down on to its pivot $q$ and allow the car to pass.

The modified form shown by Fig. 8 is more particularly described and claimed in my copending application, Serial Number 657,801; filed October 31, 1911.

I claim as my invention:—

1. A device for stopping runaway cars, consisting of a frame mounted to slide upon the tracks with a retarding frictional engagement, and a means carried by said frame and adapted to catch and hold to a car passing over said rails.

2. A device for stopping runaway cars, consisting of a frame mounted to slide upon the tracks with a retarding frictional engagement, and a means carried by said frame and adapted to catch and hold to a car passing over said rails in one direction, but adapted to permit the car to pass in the other direction without catching or holding to the same.

3. In a device for stopping runaway cars, the combination of a pair of track rails, a brake rail parallel to and beneath each rail, a frame slidably mounted on said track rails with a retarding frictional engagement, a cam-shaped part pivoted to said frame and adapted to be moved into frictional engagement with the brake-rail, and means adapted to engage a car truck passing over said rail and to move said cam-shaped part into engagement with the brake-rail.

4. A device for stopping runaway trucks or cars on inclined tracks consisting of a frame mounted to slide on the track rails, a weighted lever loosely pivoted in said frame between the track rails to normally extend upwardly, a brake rail beneath the track, a hook pivotally mounted in the said frame to engage a runaway truck, said hook remaining out of engagement during the normal passage of trucks in either direction, means, on the said upwardly extending lever to engage and throw up said hook to engage a runaway truck, when the said lever is violently struck by the latter.

5. A device for stopping runaway trucks or cars on inclined tracks consisting of a frame mounted to slide on the track rails, a weighted lever loosely pivoted in said frame between the track rails to normally extend upwardly, a brake rail beneath the track, a hook pivotally mounted in the said frame to engage a runaway truck, said hook remaining out of engagement during the normal passage of trucks in either direction, means on the said upwardly extending lever to throw up said hook to engage a runaway truck, when the said lever is violently struck by the latter and means for keeping the lower end of the said lever in braking contact with the brake rail when the hook and truck are coupled.

6. A device for stopping runaway trucks or cars on inclined tracks, consisting of a frame mounted to slide on the track rails, a weighted lever loosely pivoted in said frame and adapted to extend with its upper end into the path of movement of the truck, a coupling hook and means in connection with the said lever for throwing the same up to couple the frame to the truck when the said lever is violently struck by a runaway truck.

In testimony whereof I affix my signature in the presence of two witnesses.

VALENTIN STASCH.

Witnesses:
HANS ALTELTZ,
ERNST BLINCH.

Copies of this patent may be obtained for five cents each, by addressing the "Commissioner of Patents, Washington, D. C."